United States Patent
Xiong et al.

(10) Patent No.: US 10,011,027 B1
(45) Date of Patent: Jul. 3, 2018

(54) LEG STRUCTURE AND HUMANOID ROBOT

(71) Applicant: UBTECH Robotics Corp., Shenzhen (CN)

(72) Inventors: Youjun Xiong, Shenzhen (CN); Feng Hu, Shenzhen (CN); Xinpu Chen, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/465,621

(22) Filed: Mar. 22, 2017

(30) Foreign Application Priority Data

Dec. 29, 2016 (CN) .......................... 2016 1 1246936

(51) Int. Cl.
| | |
|---|---|
| B25J 17/00 | (2006.01) |
| B62D 57/032 | (2006.01) |
| B25J 15/02 | (2006.01) |
| B25J 18/04 | (2006.01) |
| B25J 17/02 | (2006.01) |

(52) U.S. Cl.
CPC ............... *B25J 17/00* (2013.01); *B25J 15/02* (2013.01); *B25J 17/0258* (2013.01); *B25J 17/0275* (2013.01); *B25J 18/04* (2013.01); *B62D 57/032* (2013.01); *Y10S 901/01* (2013.01); *Y10S 901/28* (2013.01)

(58) Field of Classification Search
CPC ........ B25J 17/0258; B25J 18/04; B25J 17/00; B25J 15/02; B25J 17/0275; Y10S 901/15; Y10S 901/28
See application file for complete search history.

(56) References Cited

U.S. PATENT DOCUMENTS

| | | | |
|---|---|---|---|
| 6,583,595 B1 * | 6/2003 | Hattori ................. | B62D 57/032 318/567 |
| 7,013,750 B1 * | 3/2006 | Kazami ..................... | B25J 9/08 74/490.03 |
| 9,815,192 B1 * | 11/2017 | Du ........................... | B25J 9/102 |
| 2005/0113973 A1 * | 5/2005 | Endo ....................... | B25J 9/161 700/245 |
| 2009/0282944 A1 * | 11/2009 | Kim ..................... | B25J 17/0275 74/490.05 |
| 2012/0316683 A1 * | 12/2012 | Seo ...................... | B62D 57/032 700/261 |
| 2015/0266185 A1 * | 9/2015 | Sekine ................... | B25J 13/088 74/490.01 |
| 2016/0185405 A1 * | 6/2016 | Takanishi ............. | B62D 57/032 180/8.3 |
| 2017/0095933 A1 * | 4/2017 | Houchu ................... | B25J 17/00 |

* cited by examiner

*Primary Examiner* — Kevin Hurley
*Assistant Examiner* — Marlon Alexander Arce

(57) ABSTRACT

A leg structure includes: a pair of first-stage leg servos connected to the waist structure, each of the first-stage leg servos including a first output shaft; second-stage leg servos corresponding to and arranged opposite to the first-stage leg servos, the second-stage leg servos including second output shafts perpendicular to the first output shaft; a pair of connecting assemblies each used for mounting one of the first-stage leg servos and one of the second-stage leg servos, the connecting assemblies each including a connecting member for mounting one end of the first output shaft and one end of the second output shaft, a first end cover fixed to the connecting member and used for mounting the other end of the first output shaft, and a second end cover fixed to the connecting member and used for mounting the other end of the second output shaft.

10 Claims, 5 Drawing Sheets

LEG STRUCTURE AND HUMANOID ROBOT

CROSS REFERENCE TO RELATED APPLICATIONS

This application claims priority to Chinese Patent Application No. 201611246936.8, filed Dec. 29, 2016, which is hereby incorporated by reference herein as if set forth in its entirety.

BACKGROUND

1. Technical Field

The present disclosure generally relates to robotic technology, and particularly to a leg structure and a humanoid robot including the leg structure.

2. Description of Related Art

For a long time, robot technology is mainly used in the production process automation, and developed to improve production efficiency and processing precision. Such robots are collectively referred to as industrial robots. Another type of robots are humanoid robots that can complete a variety of services at home, such as cleaning, entertaining, and home security, which requires humanoid robots to have flexible joints.

Some conventional humanoid robots are provided with two degrees of freedom, i.e. forward and backward rotational degrees of freedoms at the position where a leg and a waist are connected, resulting in the flexibility of the connection between the waist and the leg not enough.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
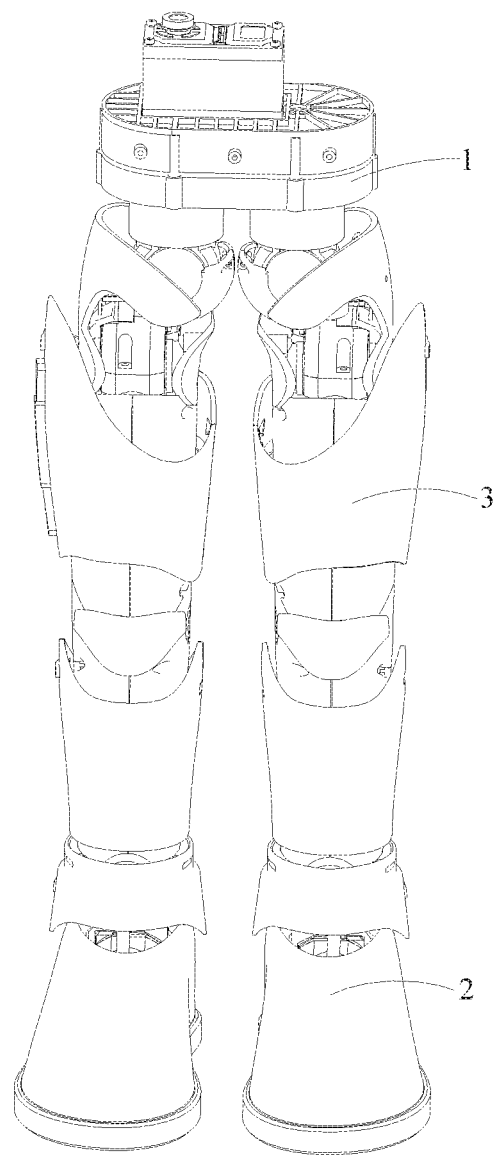
FIG. 1 is an isometric view of an assembly of a waist structure, leg structures and foot structures according to one embodiment.
Figure 2:
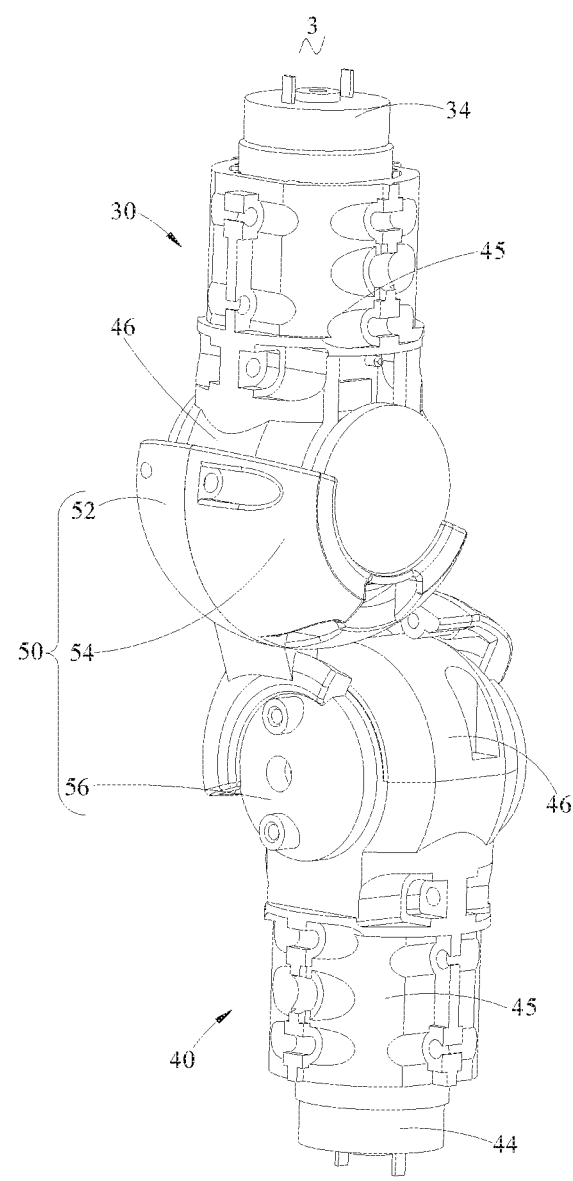
FIG. 2 is an isometric view of a leg structure of FIG. 1.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-5, in one embodiment, a leg structure 3 is used for connecting a waist structure 1 and two foot structures 2 of a humanoid robot. The leg structure 3 includes: a pair of first-stage leg servos 30 connected to the waist structure 1, second-stage leg servos 40 corresponding to and arranged opposite to the first-stage leg servos 30, and a pair of connecting assemblies 50 each used for mounting one of the first-stage leg servos 30 and one of the second-stage leg servos 40. Each of the first-stage leg servos 30 includes a first output shaft 32, and the second-stage leg servos 40 include second output shafts 42 perpendicular to the first output shaft 32. The connecting assemblies 50 each include a connecting member 52 for mounting one end of the first output shaft 32 and one end of the second output shaft 42, a first end cover 54 securely connected to the connecting member 52 and used for mounting the other end of the first output shaft 32, and a second end cover 56 securely connected to the connecting member 52 and used for mounting the other end of the second output shaft 42.

Compared with conventional leg structures, the leg structure 3 of the present disclosure has an advantage as follows. The leg structure 3 is provided by arranging the first-stage leg servos 30 and the second-stage leg servos 40 to be opposite each other and connecting the first-stage leg servos 30 and the second-stage leg servos 40 by connecting assemblies 50, to enable the connecting portion between the leg structures 3 and the waist structure 1 to be rotatable. The first-stage leg servos 30 are mounted on the connecting members 52 and the first end covers 54 and the connecting members 52 and the first end covers 54 are rotatable with respect to the first-stage leg servos 30. The second-stage leg servos 40 are mounted on the connecting members 52 and the second end covers 56 and the connecting members 52 and the second end covers 56 are rotatable with respect to the second-stage leg servos 40, thereby increasing the degree of freedom of the leg structure 3, and enhancing the flexibility of the rotation of the leg structure 3.

In the embodiment, opposite ends of the first output shaft 32 of the first-stage leg servos 30 are respectively mounted at one side of the connecting member 52 and the first end cover 54. Opposite ends of the second output shaft 42 of the second-stage leg servos 40 are respectively mounted at the other side of the connecting member 52 and the second end cover 56. The connecting member 52 and the first end cover 54 are thus rotatable about the first output shaft 32 with respect the first leg servo 30. Similarly, the connecting member 52 and the second end cover 56 are rotatable about the second output shaft 42 with respect to the second-stage leg servo 40.

In the embodiment, the first end cover 54, the second end cover 56 are securely connected to the connecting member 52, or the first end cover 54, the second end cover 56, and the connecting member 52 may be integrally formed.

In the embodiment, the first output shaft 32 is perpendicular to the second output shaft 42. The first-stage leg servos 30 and the second-stage leg servos 40 are stacked along the longitudinal direction of leg structure 3. The connecting member 52 is located between the first-stage leg servo 30 and the second-stage leg servo 40.

Referring to FIGS. 2-5, the connecting member 52 includes an integrally formed first connecting structure 522 and a second connecting structure 524. The first connecting structure 522 is securely connected to the first end cover 54 and defines a first receiving chamber 58 for partly accommodating the first leg servo 30. The second connecting structure 524 is securely connected to the second end cover 56 and defines a second receiving chamber 59 for partly accommodating the second leg servo 40. The connecting member 52 is provided with the first connecting structure 522 and the second connecting structure 524 that are integrally formed, to form a unitary structure, which ensures the firmness and stability of the connection of the first-stage leg servo 30 to the second-stage leg servo 40, and avoids the rotation or shaking of the first connecting structure 522 and the second connecting structure 524 during rotation of the first connecting structure 522 with respect to the first-stage leg servo 30. The same effect also applies to the second-stage leg servo 40. The first-stage leg servo 30 is partly received in the first receiving chamber 58 formed by the first connecting structure 522 and the first end cover 54, and the second-stage leg servo 40 is partly received in the second receiving chamber 59 formed by the second connecting structure 524 and the second end cover 56, which prevents the first-stage leg servo 30 and the second-stage leg servo 40 from moving and shaking along their respective axes as they rotate.

In the embodiment, the first connecting structure 522 and the second connecting structure 524 are stacked along the longitudinal direction of leg structure 3.

In other embodiments, the first connecting structure 522 and the second connecting structure 524 may be two independent components and may be connected to each other by detachable/undetachable connection means.

Referring to FIGS. 2-5, the first connection structure 522 includes a first connection portion 5220 securely connected to the first end cover 54 and a first side end cover 5224 extending along the first connection portion 5220. The first side end cover 5224 is provided with a first shaft hole 5226. The first end cover 54 includes a first side plate 540 securely connected to the first connection portion 5220 and a first cover portion 542 extending along the first side plate 540. The first cover portion 542 is provided with a second shaft hole 544 opposite to and coaxial with the first shaft hole 5226. Opposite ends of the first output shaft 32 are respectively received in the first shaft hole 5226 and the second shaft hole 544. The first connection portion 5220 of the first connection portion 522 and the first side plate 540 of the first end cover 54 are fixed to each other by screws, which forms a guide groove for the first-stage leg servo 30. That is, the first connection portion 5220 and the first side plate 540 cooperatively define a guide groove that has a shape similar to the shape of the first-stage leg servo 30. The shape of the first-stage leg servo 30 refers to the shape of the portion accommodated in the first receiving chamber 58. Opposite ends of the first output shaft 32 of the first-stage leg servo 30 are respectively received in the first shaft hole 5226 of the first side end cover 5224 and the second shaft hole 544 of the first cover portion 542, which enables the first side end cover 5224 and the first cover portion 542 to be rotatable about the first output shaft with respect to the first-stage leg servo 30.

In the embodiment, the first side end cover 5224 faces the first cover portion 542, and the first shaft hole 5226 and the second shaft hole 544 are coaxial with each other.

In the embodiment, the first connection portion 5220 and the first side end cover 5224 and integrally formed. The first side plate 540 and the first cover portion 542 are integrally formed.

Figure 3:
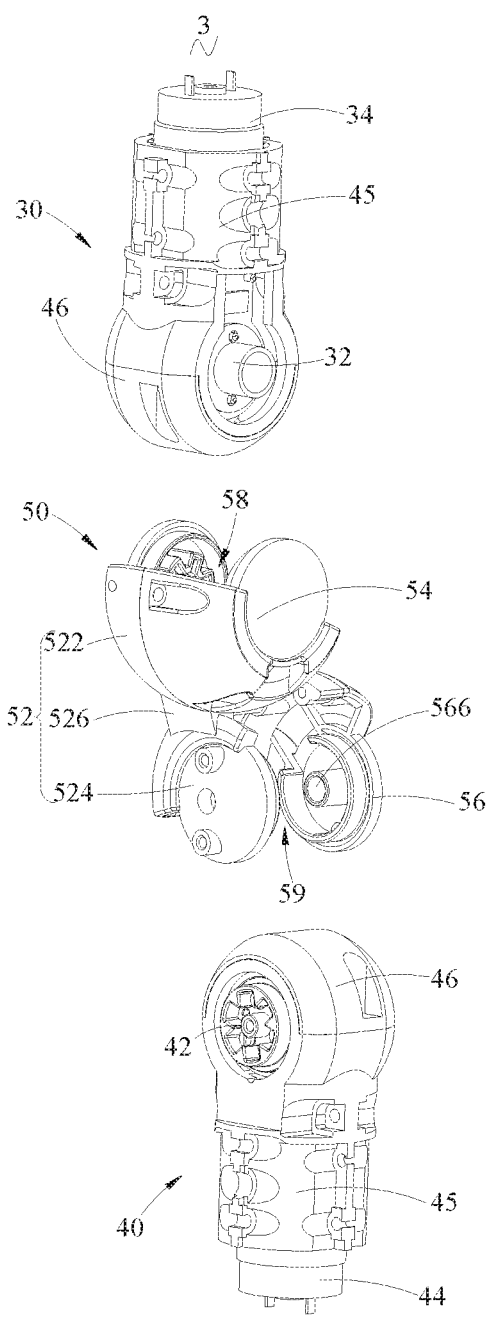
FIG. 3 is an exploded isometric view of the leg structure of FIG. 2.
Figure 4:
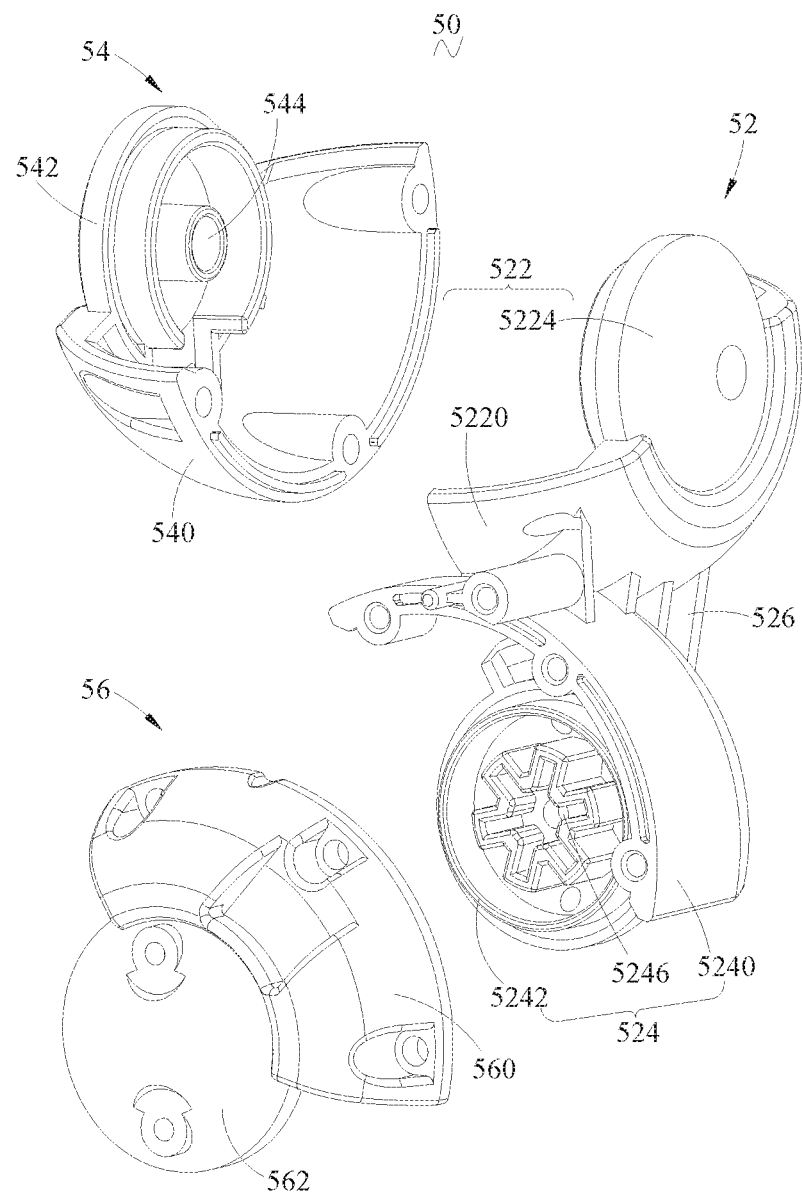
FIG. 4 is an exploded isometric view of a connecting assembly of FIG. 3, viewed from a first viewpoint.
Figure 5:
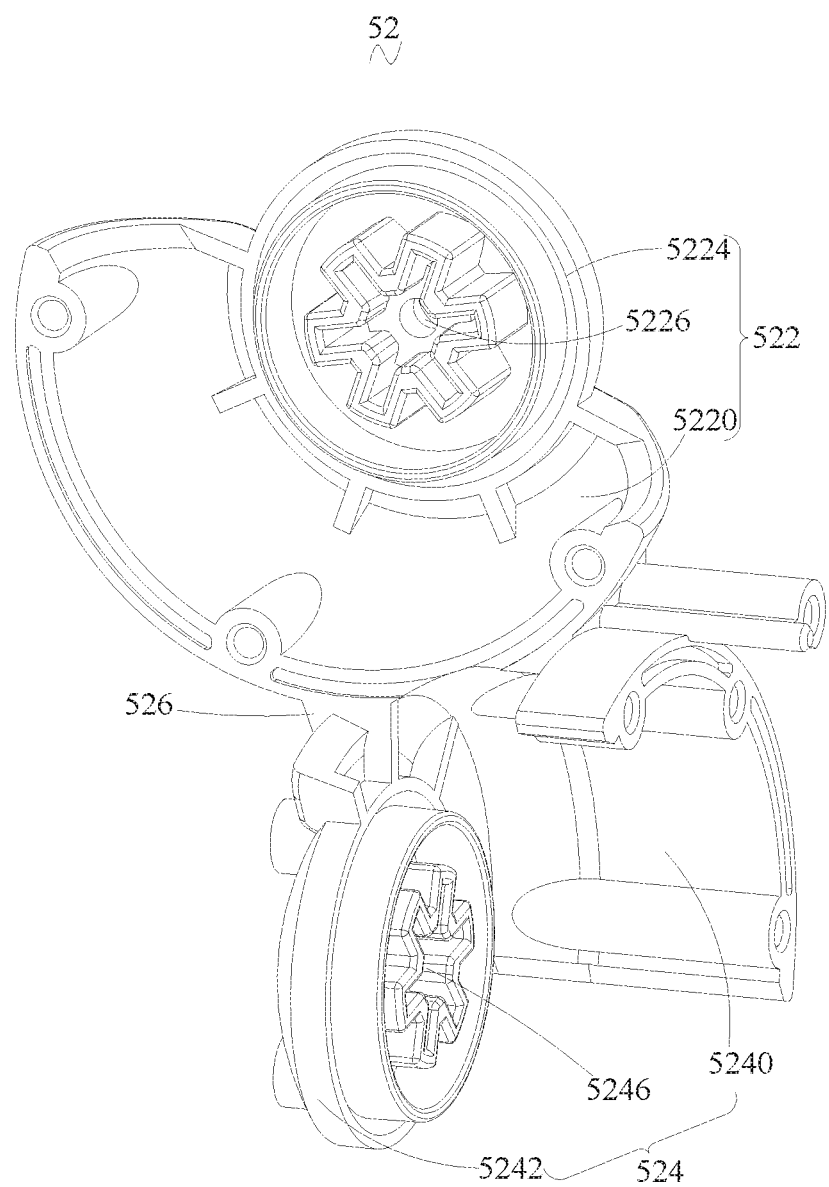
FIG. 5 is an exploded isometric view of a connecting assembly of FIG. 3, viewed from a second viewpoint.

Referring to FIGS. 3-5, the first connection portion 5220 and the first side plate 540 define cooperatively an arc-shaped first receiving chamber 58, and a gap is formed between each of the inner walls of the first connection portion 5220 and the first side plate 540 and a housing of the first-stage servo 30. It is to be understood that the portion of the first-stage leg servo 30 received in the first receiving chamber 58 has an arc shape in a direction perpendicular to the first output shaft 32. The portion of the first receiving chamber 58 that receives the first-stage leg servo 30 is also arc-shaped in a cross-section perpendicular to the first output shaft 32 so as to ensure that the stability and reliability of the rotation of the first-stage leg servo 30 within the first receiving chamber 58. The leg structure 3 is provided with a clearance between the housing of the first-stage leg servo 30 and the inner wall of the first receiving chamber 58 to ensure that the first-stage leg servos 30 can smoothly rotate in the first receiving chamber 58.

Referring to FIGS. 3-5, the second connecting structure 524 includes a second connection portion 5240 securely connected to the second end cover 56 and integrally formed with the first connection portion 5220 and a second side end cover 5242 extending along the second connection portion 5240. The second side end cover 5242 defines a first connection hole 5246. The second end cover 56 includes a second side plate 560 securely connected to the second connection portion 5240 and a second cover portion 562 extending along the second side plate 560. The second cover portion 562 defines a second connection hole 566 which is opposite to and coaxial with the first connection hole 5246. Opposite ends of the second output shaft 42 are respectively received in the first connection hole 5246 and the second connection hole 566. The second connection portion 5240 of the second connecting structure 524 and the second side plate 560 of the second end cover 56 are securely connected to each other by screws to form a guide groove for the second-stage leg servo 40. That is, the second connection portion 5240 and the second side plate 560 cooperatively define a guide groove that has a shape similar to the shape of the second-stage leg servo 40. The shape of the second-stage leg servo 40 refers to the shape of the portion accommodated in the second receiving chamber 59. Opposite ends of the second output shaft 42 of the second-stage leg servo 40 are respectively received in the first connection hole 5246 of the second side end cover 5242 and the second connection hole 566 of the second cover portion 562, which enables the second side end cover 5242 and the second cover portion 562 to be rotatable about the second output shaft with respect to the second-stage leg servo 40.

In the embodiment, the second side end cover 5242 face the second cover portion 562, and the first connection hole 5246 and the second connection hole 566 are coaxial to each other.

In the embodiment, the second connection portion 5240 and the second sides cover 5242 are integrally formed. The second side plate 560 and the second cover portion 562 are integrally formed.

Referring to FIGS. 3-5, the second connection portion 5240 and the second side plate 560 define cooperatively an arc-shaped second receiving chamber 59, and a gap is formed between each of the inner walls of the second connection portion 5240 and the second side plate 56 and a housing of the second-stage servo 40. It is to be understood that the portion of the second-stage leg servo 40 received in the second receiving chamber 59 has an arc shape in a direction perpendicular to the second output shaft 42. The portion of the second receiving chamber 59 that receives the second-stage leg servo 40 is also arc-shaped in a cross-section perpendicular to the second output shaft 32 so as to ensure that the stability and reliability of the rotation of the second-stage leg servo 40 within the second receiving chamber 59. The leg structure 3 is provided with a clearance between the housing of the second-stage leg servo 40 and the inner wall of the second receiving chamber 59 to ensure that the second-stage leg servos 40 can smoothly rotate in the second receiving chamber 59.

Referring to FIGS. 3-5, the connecting member 52 further includes a plurality of ribs 526 spaced apart from each other and extending along an outer surface of the first connection portion 5220 toward an outer surface of the second connection portion 5240. The connecting member 52 is provided with ribs 526 on the outer surfaces of the first connection portion 5220 and the second connection portion 5240 to ensure the strength of connection between the first connection portion 5220 and the second connection portion 5240, and avoid deformation of the first connection portion 5220 and the second connection portion 5240. It is to be understood that the ribs 526, the first connection portion 5220 and the second connection portion 5240 are integrally formed.

In the embodiment, the ribs 526 are plural and distributed with equal spacing between the first connection portion 5220 and the second connection portion 5240 so that the distribution of the force applied thereon are uniform.

Referring to FIGS. 2-5, the first-stage servos 30 and the second-stage servos 40 are both spherical. The first-stage servos 30 and the second-stage servos 40 each include a power component 45 and a spherical mechanism 46 for outputting power of the power component 45. The spherical mechanisms 46 of the first-stage servos 30 each include the first output shaft 32. The spherical mechanisms 46 of the second-stage servos 40 each include the second output shaft 42. The leg structure 3 is configured such that the first-stage leg servos 30 and the second-stage leg servos 40 are spherical servos so that the spherical structures thereof can be accommodated in the first receiving chamber 58 and the second receiving chamber 59 and the connecting member 52 is rotatable about the first output shaft 32 and the second output shaft 42, which provides greater degrees of freedom for the leg structure 3 and ensures the flexibility of the leg structure 3.

Referring to FIGS. 1-5, the first-stage servos 30 each include a first connection end connected to the waist structure 1. The first connection ends are located on a side of the power components 45 of the first-stage servos 30 away from the spherical mechanisms 46. The second-stage servos 40 each include a second connection end connected to the foot assembly 2. The second connection ends are located on a side of the power components 45 of the second-stage servos 40 away from the spherical mechanisms 46. An axis of each of the first connection ends and an axis of each of the second connection ends are parallel to each other. It is to be understood that the first-stage leg servos 30 and the second-stage leg servos 40 are arranged along the longitudinal direction of the leg structure 3. The spherical mechanisms 46 of the first-stage leg servos 30 and the second-stage leg servos 40 face each other and are arranged at opposite sides of the connecting member 52. The first connection ends and the second connection ends are located at opposite sides away from the connecting member 52. The axis of each of the first connection ends and the axis of each of the second connection ends are parallel to each other to ensure that the leg structures 3 can move freely and are able to support the waist structure 1.

In the embodiment, the first-stage leg servos 30 and the second-stage leg servos 40 are spherical servos. That is, one end of each of their housings is spherical and the other end is substantially cylindrical. They each include the power component 45, a reduction mechanism rotating as driven by the power component 45, and the output shaft provided at the output end of the reduction mechanism. The reduction mechanism is realized by multi-stage gear transmission. It is to be understood that the internal power structures of the first-stage leg servos 30 and the second-stage leg servos 40 are not limited thereto and may be of any structural forms capable of providing power.

Referring to FIGS. 1-5, a humanoid robot includes a head, a trunk connected with the head, and two legs and two arms connected to the trunk. The trunk includes a waist structure 1 connected to the legs. Each of the legs includes a leg structure 3 of any one of the above embodiments connected to the waist structure 1 and a foot structure 2 connected to the leg structure 3.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A leg structure for connecting a waist structure and two foot structures of a humanoid robot, the leg structure comprising:
  a pair of first-stage leg servos connected to the waist structure, each of the first-stage leg servos comprising a first output shaft;
  second-stage leg servos corresponding to and arranged opposite to the first-stage leg servos, the second-stage leg servos comprising second output shafts perpendicular to the first output shaft;
  a pair of connecting assemblies each configured for mounting one of the first-stage leg servos and one of the second-stage leg servos, the connecting assemblies each comprising a connecting member for mounting one end of the first output shaft and one end of the second output shaft, a first end cover securely connected to the connecting member and configured for mounting the other end of the first output shaft, and a second end cover securely connected to the connecting member and configured for mounting the other end of the second output shaft.

2. The leg structure of claim 1, wherein the connecting member comprises an integrally formed first connecting structure and a second connecting structure, the first connecting structure is securely connected to the first end cover and defines a first receiving chamber for partly accommodating the first leg servo, and the second connecting structure is securely connected to the second end cover and defines a second receiving chamber for partly accommodating the second leg servo.

3. The leg structure of claim 2, wherein the first connection structure comprises a first connection portion securely connected to the first end cover and a first side end cover extending along the first connection portion, the first side end cover is provided with a first shaft hole, the first end cover comprises a first side plate securely connected to the first connection portion and a first cover portion extending along the first side plate, the first cover portion is provided with a second shaft hole opposite to and coaxial with the first shaft hole, and opposite ends of the first output shaft are respectively received in the first shaft hole and the second shaft hole.

4. The leg structure of claim 3, wherein the first connection portion and the first side plate define cooperatively an arc-shaped first receiving chamber, and a gap is formed between each of the inner walls of the first connection portion and the first side plate and a housing of the first-stage servo.

5. The leg structure of claim 3, wherein the second connecting structure comprises a second connection portion securely connected to the second end cover and integrally formed with the first connection portion and a second side end cover extending along the second connection portion, the second side end cover defines a first connection hole, the second end cover comprises a second side plate securely connected to the second connection portion and a second cover portion extending along the second side plate, the second cover portion defines a second connection hole which is opposite to and coaxial with the first connection hole, and opposite ends of the second output shaft are respectively received in the first connection hole and the second connection hole.

6. The leg structure of claim 5, wherein the second connection portion and the second side plate define cooperatively an arc-shaped second receiving chamber, and a gap is formed between each of the inner walls of the second connection portion and the second side plate and a housing of the second-stage servo.

7. The leg structure of claim 5, wherein the connecting member further comprises a plurality of ribs spaced apart from each other and extending along an outer surface of the first connection portion toward an outer surface of the second connection portion.

8. The leg structure of claim 1, wherein the first-stage servos and the second-stage servos are both spherical, the first-stage servos and the second-stage servos each comprise a power component and a spherical mechanism for outputting power of the power component, the spherical mechanisms of the first-stage servos each comprise the first output shaft, and the spherical mechanisms of the second-stage servos each comprise the second output shaft.

9. The leg structure of claim 8, wherein the first-stage servos each comprise a first connection end connected to the waist structure, the first connection ends are located on a side of the power components of the first-stage servos away from the spherical mechanisms; the second-stage servos each comprise a second connection end connected to the foot assembly, the second connection ends are located on a side of the power components of the second-stage servos away from the spherical mechanisms, and an axis of each of the first connection ends and an axis of each of the second connection ends are parallel to each other.

10. A humanoid robot comprising a head, a trunk connected with the head, and two legs and two arms connected to the trunk, the trunk comprising a waist structure connected to the legs, each of the legs comprising a leg structure of claim 1 connected to the waist structure and a foot structure connected to the leg structure.

* * * * *